3,146,193
AQUEOUS SUSPENSION CLARIFICATION METHOD
Edward J. Sullivan, Bay City, Mich., assignor to The Dow Chemical Company, Midland, Mich., a corporation of Delaware
No Drawing. Filed Apr. 4, 1960, Ser. No. 19,487
4 Claims. (Cl. 210—54)

This invention is concerned with a method for the clarification of aqueous suspensions of fine-divided inorganic solids and is particularly directed to such a method wherein certain copolymers of vinyl-substituted heterocyclic, nitrogen-containing compounds with acrylamide are employed to facilitate the clarification.

In recent years marked improvement in ease of separation of finely-divided solids from aqueous suspension either by sedimentation or by filtration have been accomplished by incorporating small amounts of high-molecular weight water-soluble polymers in such suspensions. Among such polymers high-molecular weight polyacrylamide and hydrolysis products thereof have proved to be outstanding on a wide variety of ore suspensions. In some cases, however, the polyacrylamides and related hydrolysis products, while being highly effective for improving the separation of the major portion of the suspended solids, fail to agglomerate a portion of very finely-divided solids which remain in suspension and produce a turbid supernatant liquid. One solution to this problem has been to employ glue in addition to the acrylamide type polymers. Such use of glue is undesirable because of the necessity of introducing an additional reagent, because of the large quantities of glue required and because glue, a natural product, may promote growth of microorganisms in the clarified liquid with attendant plugging of filters and the like. Glue may also cause undesired foaming in the clarified liquid.

It is an object of the present invention to supply an improved method for the separation of finely-divided solids from aqueous suspension. It is a further object to provide improvement in sedimentation and clarification of such suspensions using only a single copolymer agent. Other objects will become apparent from the following specifications and claims.

In accordance with the present invention, high-molecular weight water-soluble copolymers of certain vinyl-substituted, nitrogen-containing, heterocyclic ring compounds with acrylamide are incorporated in aqueous suspensions of finely-divided inorganic solids to aid in accomplishing the concentration and separation of such solids. It is among the advantages of the invention that only small amounts of the active copolymers when incorporated in such suspensions without auxiliary agents bring about a desirably high rate of sedimentation of the solids and in addition provide a surprising improvement in the clarity of the supernatant liquid resulting from the sedimentation.

The copolymers employed in the present invention, hereinafter referred to as N-heterocyclic copolymers, are water-soluble, substantially linear, high-molecular-weight products obtained by copolymerization through the ethylenic double bond of a mixture of from about 80 to 99 percent by weight of acrylamide with correspondingly from about 20 to about 1 percent by weight of a mono-vinyl heterocyclic ring compound wherein the ring contains one nitrogen and not more than one oxygen with the balance of the ring atoms consisting of carbon atoms and wherein the total number of atoms in the ring system is 5 or 6. Representative vinyl-substituted N-heterocyclic monomer compounds employed in the preparation of the N-heterocyclic copolymers are N-vinyl-2-oxazolidinone, N-vinyl-5-methyl-2-oxazolidinone, N-vinyl-5-ethyl-2-oxazolidinone, N-vinyl-4-methyl-2-oxazolidinone, N-vinyl-pyrrolidone, 2- or 4-vinyl pyridine, N-vinyl-2-oxazinidinone and the like.

The N-heterocyclic copolymers may be prepared in conventional fashion for vinyl polymerizations. In a preferred method of preparation acrylamide and one of the above described vinyl-substituted N-heterocyclic compounds are dissolved in water to produce a solution containing from about 10 to about 30 percent by weight of the total monomers and in the proportions of from 80 to 99 parts by weight of acrylamide to correspondingly from 20 to 1 parts of the vinyl-substituted heterocyclic compound. The resulting solution is subjected to the action of free radicals as, for example, the free radicals produced by the addition to the solution of a peroxide or azo type polymerization catalyst accompanied by heating if necessary. The copolymerization reaction is exothermic and proceeds readily once initiated by the introduction of the free radicals. Suitable catalysts include tertiaryalkyl hydroperoxides and peroxides, such as tertiarybutyl hydroperoxide and tertiarybutyl peroxide, aralkyl hydroperoxides, such as cumene hydroperoxide, alkali metal persulfates, aliphatic azo compounds such as azobisisobutyronitrile and the like.

In a representative preparation, 5 parts by weight of N-vinyl-5-methyl-2-oxazolidinone and 95 parts by weight of acrylamide are dissolved in water to prepare a solution containing about 15 percent by weight of total monomers. The pH of the solution is adjusted to the range of pH 6 to 7 and 2000 parts by weight of the disodium salt of ethylenediaminetetraacetic acid per million parts of solution is added to sequester metallic ions which might interfere with the polymerization. The solution is then heated to about 40° C. and from 200 to 500 parts of tertiarybutyl hydroperoxide and from 200 to 500 parts of potassium persulfate per million parts of monomers present are added with stirring. The copolymerization reaction is readily initiated when the catalysts are added to the reaction mixture and proceeds with the evolution of heat. On completion of the reaction, the crude copolymer product is obtained as a tough, highly viscous, aqueous gel. The latter may be dried, for example, on double drum driers to produce a white flaky copolymer product.

In carrying out the invention, the N-heterocyclic copolymer is distributed in the suspension of finely divided inorganic solids in any fashion by which rapid, thorough mixing may be accomplished without excessive agitation. In a preferred method of operation, the copolymer is dissolved in water and introduced into the suspension in the form of a dilute aqueous solution. Following the incorporation of the copolymer solution, the treated suspension is transferred with a minimum of agitation and shearing action into a quiescent zone such as a sedimentation vessel to allow the development and settling of agglomerates of the finely divided solids. In practice, the copolymer solution may be sprayed or otherwise introduced into a flume or other conduit through which the suspension is moving. In such operations, the conduit may be equipped with baffle plates or other means of mild agitation at or immediately following the point of introduction of the copolymer solution in order to assure thorough mixing. Preferably the copolymer solution is added portionwise or at a plurality of sites to accomplish thorough distribution of flocculant without local overtreatment.

Following the mixing of the solution of hte N-heterocyclic copolymer with the suspension of finely divided solids, as set forth above, the treated suspension may be submitted to various conventional procedures for the concentration or separation of the solids from the suspension. For example, the treated suspension may be fed into a settling tank or thickener to effect the separation of a concentrated slurry of solids as an underflow product and a clarified aqueous effluent as an overflow product.

In the preparation of the copolymer solutions for use in the invention it is generally convenient to prepare an aqueous concentrate or stock solution containing from about 0.5 to about 2 percent by weight of copolymer and to dilute such stock solution as needed for use. The dilute treating solutions actually added to the suspension preferably contain from about 0.01 to about 0.1 percent by weight of the copolymer.

The amount of N-heterocyclic copolymer to be employed will vary depending upon the type of inorganic solids, the degree of subdivision thereof and the rate of settling required. With highly amenable solids, such as certain chemical precipitates, excellent improvement in settling rate and clarity of supernatant liquid are obtained when employing only 0.001 pound of copolymer per ton of suspended solids. For most finely ground minerals, good results are obtained when employing from about 0.01 to about 0.1 pound of the copolymer per ton of suspended solids although loadings ranging up to 1 or 2 pounds of copolymer per ton of solids may sometimes be required, particularly when the solids are to be filtered following treatment. In any case, an amount sufficient to increase the rate of sedimentation of the solids is employed. In some cases, the N-heterocyclic copolymers are conveniently employed in conjunction with other flocculants such as polyacrylamides or glue.

In addition to the composition of the N-heterocyclic copolymers as set forth above, an important criterion for usefulness in the invention is that the copolymers be of high molecular weight. A convenient index of molecular weight of such copolymers is provided by the viscosity of aqueous solutions thereof under standard conditions. The expression "0.5 percent viscosity" as hereinafter employed means the viscosity in centipoises of a 0.5 percent by weight solution of the copolymer in distilled water at 25° C. and adjusted to a pH of 3 to 3.5, as determined with an Ostwald viscosimeter. Copolymers for use in accordance with the invention should have 0.5 percent viscosities of at least 2 centipoises and preferably of 4 centipoises or more.

The following examples illustrate the invention but are not to be construed as limiting the same.

Example 1

A sandstone from the Colorado plateau region containing small amounts of carnotite and other uranium compounds was finely ground and treated with sulfuric acid to leach out uranium compounds in soluble form. The slurry resulting from the acid treatment had a pH of 1.9 and contained 15 grams of difficultly settleable solids per 100 milliliters of slurry. 100-milliliter portions of the slurry were employed in the following tests.

A commercial flocculant grade of water-soluble polyacrylamide, characterized by a 0.5 percent viscosity of 7.8 centipoises and having about 5 percent of its amide groups hydrolyzed to carboxyl groups, was employed as a standard of comparison since the polymeric product has been the most universally employed sedimentation and filtration aid in uranium ore processing up to the present. Parallel determinations were carried out with the polyacrylamide and with copolymers of: (1) 95 percent by weight of acrylamide (AA) with 5 percent of N-vinyl-5-methyl-2-oxazolidinone (VOM) and (2) 90 percent by weight of acrylamide with 10 percent of N-vinyl-5-methyl-2-oxazolidinone.

Each polymeric material was dissolved in water to prepare a 0.05 percent by weight treating solution thereof. Each such solution was added to separate 100 milliliter portions of the above slurry to provide loadings of 0.066 and 0.132 pound of the material under test per ton of suspended solids. In each case, the treating solution was added in 3 approximately equal increments and the cylinder of slurry was stoppered, inverted and returned to the upright position 3 times after each incremental addition to accomplish gentle, thorough mixing. After the final mixing the cylinders were returned to the upright position and timing of sedimentation was commenced. Most of the solids settled more or less rapidly so that an interface between settled suspension and an overhead layer of varying turbidity was observed. The times after initiation of sedimentation at which such interface passed successive 10-milliliter graduations on the cylinders was recorded and the time required for subsidence from the 90-milliliter to the 60-milliliter graduation was employed to calculate the settling rate for the bulk of the solids. Thereafter, a portion of the overhead liquid was drawn off and the turbidity thereof determined in a Hellige Turbidimeter standardized to read in parts of silica turbidity per million parts of water.

The characterization properties and results for the various polymeric materials are recorded in the following table:

| Flocculant employed | 0.5 percent viscosity, centipoises | Pounds of flocculant per ton of solids | Settling rate, inches per minute | Turbidity of overhead, p.p.m. |
|---|---|---|---|---|
| Polyacrylamide | 7.8 | 0.066 | 3.43 | 600 |
|  |  | 0.132 | 3.75 | 550 |
| Copolymer of 5 percent VOM and 95 percent AA | 11.3 | 0.066 | 5.88 | 79 |
|  |  | 0.132 | 6.18 | 49 |
| Copolymer of 10 percent VOM and 90 percent AA | 4.7 | 0.066 | 5.15 | 86 |
|  |  | 0.132 | 5.62 | 46 |

Example 2

A difficulty settleable slurry produced by acid leaching of a finely ground quartz pebble-conglomerate uranium ore from the Elliot Lake area of Canada was found to produce turbid overheads when treated with the conventional polyacrylamide flocculant of commerce even when a sizable proportion of glue was added. The slurry employed for the following tests had a pH of 1.7, contained 25 grams of suspended solids per 100 milliliters and had previously been treated with 0.2 pound of glue per ton of solids. Settling rates and overhead turbidities were determined following the procedures of Example 1 and employing copolymers of acrylamide (AA) with N-vinyl-2-oxozolidinone (VO) or N-vinyl-5-methyl-2-oxazolidinone (VOM). The results are summarized in the following table:

| Flocculant employed | 0.5 percent viscosity, centipoises | Pounds of flocculant per ton of solids | Settling rate, inches per minute | Turbidity of overhead, p.p.m. |
|---|---|---|---|---|
| Polyacrylamide | 7.3 | 0.04 | 4.36 | 800 |
|  |  | 0.05 | 4.52 | 770 |
| Copolymer of 5 percent VOM and 95 percent AA | 9.8 | 0.03 | 7.18 | 119 |
|  |  | 0.04 | 8.72 | 105 |
| Copolymer of 5 percent VO and 95 percent AA | 10.7 | 0.03 | 5.82 | 129 |
|  |  | 0.04 | 6.42 | 122 |
| Copolymer of 10 percent VO and 90 percent AA | 5.9 | 0.03 | 4.88 | 100 |
|  |  | 0.04 | 5.82 | 82 |

Example 3

A slurry from acid leached ore similar to that of Example 2 had a pH of 1.8 and contained 162 grams of solids per 500 milliliters of slurry. This suspension was obtained from a uranium mill process stream and had already been treated with 0.56 pound of glue per ton of solids. Settling rates and overhead turbidities were determined for portions of the slurry treated with copolymers of N-vinylpyrrolidone (VP) and acrylamide (AA) following the procedures of Example 1 except that 500-milliliter portions of the slurry were employed and the settling rate was calculated from the time for subsidence between the 450- and 300-milliliter graduations. The results are summarized in the following table:

| Flocculant employed | 0.5 percent viscosity, centipoises | Pounds of flocculant per ton of solids | Settling rate, inches per minute | Turbidity of overhead, p.p.m. |
|---|---|---|---|---|
| Copolymer of 3 percent VP and 97 percent AA | 6.9 | 0.03 | 2.2 | 18 |
|  |  | 0.05 | 2.3 | 7 |
| Copolymer of 5 percent VP and 95 percent AA | 6.0 | 0.03 | 1.6 | 9 |
| Copolymer of 7 percent VP and 93 percent AA | 15.0 | 0.03 | 3.0 | 11 |

*Example 4*

A slurry from the same ore as in Example 2 had a pH of 1.8, contained 27 grams of solids per 100 milliliters and had previously been treated with 0.5 pound of glue per ton of solids. This slurry settled only very slowly without further treatment. Settling rates and overhead turbidities were determined for portions of the slurry treated according to the procedures of Example 1, employing copolymers of N-vinyl-5-methyl-2-oxazolidinone (VOM), N-vinyl-pyrrolidone (VP) or 2-vinylpyridine (VPY) with acrylamide (AA). The results are summarized in the following table:

| Flocculant employed | 0.5 percent viscosity, centipoises | Pounds of flocculant per ton of solids | Settling rate, inches per minute | Turbidity of overhead, p.p.m. |
|---|---|---|---|---|
| Copolymer of 1 percent VOM and 99 percent AA | 23.7 | 0.074 | 3.3 | 72 |
| Copolymer of 3 percent VP and 97 percent AA | 6.9 | 0.074 | 3.6 | 37 |
| Copolymer of 5 percent VP and 95 percent AA | 8.3 | 0.037 | 3.0 | 43 |
| Copolymer of 5 percent VPY and 95 percent AA | 7.6 | 0.037 | 2.9 | 58 |

Although it has been found that as little as one percent by weight of one of the N-heterocyclic vinyl compounds copolymerized with 99 percent of acrylamide gives appreciable improvement as regards clarification of overheads, it is preferred to employ copolymers obtained from mixtures of from 3 to 10 parts of the N-heterocyclic compound with correspondingly from 97 to 90 parts of acrylamide.

I claim:

1. A method for concentrating finely divided inorganic solids from an aqueous suspension thereof which comprises admixing with said suspension a water-soluble copolymer prepared by copolymerization through the ethylenic double bonds of a mixture of from about 80 to 99 percent by weight of acrylamide with correspondingly from about 20 to about one percent by weight of a monovinyl heterocyclic ring compound selected from the group consisting of N-vinyl-2-oxazolidinone, N-vinyl-5-methyl-2-oxazolidinone and N-vinylpyrrolidone, said copolymer being characterized by a viscosity of at least 2 centipoises for a 0.5 percent by weight solution thereof in distilled water adjusted to a pH of 3 to 3.5 and a temperature of 25° C. and being employed in amount sufficient to cause accelerated sedimentation of the suspended solids, and maintaining the treated suspension under quiescent conditions to separate a clarified supernatant liquid layer and a concentrated solids suspension layer.

2. A method for concentrating finely divided inorganic solids from an aqueous suspension thereof which comprises admixing with said suspension a water-soluble copolymer prepared by copolymerization through the ethylenic double bonds of a mixture of from about 80 to 99 percent by weight of acrylamide with correspondingly from about 20 to about one percent by weight of N-vinyl-2-oxazolidinone, said copolymer being characterized by a viscosity of at least 2 centipoises for a 0.5 percent by weight solution thereof in distilled water adjusted to a pH of 3 to 3.5 and at a temperature of 25° C. and being employed in amount sufficient to cause accelerated sedimentation of the suspended solids, and maintaining the treated suspension under quiescent conditions to separate a clarified supernatant liquid layer and a concentrated solids suspension layer.

3. A method for concentrating finely divided inorganic solids from an aqueous suspension thereof which comprises admixing with said suspension a water-soluble copolymer prepared by copolymerization through the ethylenic double bonds of a mixture of from about 80 to 99 percent by weight of acrylamide with correspondingly from about 20 to about one percent by weight of N-vinyl-5-methyl-2-oxazolidinone, said copolymer being characterized by a viscosity of at least 2 centipoises for a 0.5 percent by weight solution thereof in distilled water adjusted to a pH of 3 to 3.5 and at a temperature of 25° C. and being employed in amount sufficient to cause accelerated sedimentation of the suspended solids, and maintaining the treated suspension under quiescent conditions to separate a clarified supernatant liquid layer and a concentrated solids suspension layer.

4. A method for concentrating finely divided inorganic solids from an aqueous suspension thereof which comprises admixing with said suspension a water-soluble copolymer prepared by copolymerization through the ethylenic double bonds of a mixture of from about 80 to 99 percent by weight of acrylamide with correspondingly from about 20 to about one percent by weight of N-vinylpyrrolidone, said copolymer being characterized by a viscosity of at least 2 centipoises for a 0.5 percent by weight solution thereof in distilled water adjusted to a pH of 3 to 3.5 and at a temperature of 25° C. and being employed in amount sufficient to cause accelerated sedimentation of the suspended solids, and maintaining the treated suspension under quiescent conditions to separate a clarified supernatant liquid layer and a concentrated solids suspension layer.

References Cited in the file of this patent

UNITED STATES PATENTS

| 2,625,529 | Hedrick et al. | Jan. 13, 1953 |
| 2,688,550 | McFarlane | Sept. 7, 1954 |
| 2,740,522 | Aimone et al. | Apr. 3, 1956 |
| 2,872,321 | Walles | Feb. 3, 1959 |
| 2,872,322 | Walles | Feb. 3, 1959 |
| 2,894,603 | Vasan | July 14, 1959 |
| 2,937,143 | Goren | May 17, 1960 |
| 2,955,932 | Goren | Oct. 11, 1960 |

FOREIGN PATENTS

| 760,653 | Great Britain | Nov. 7, 1956 |

OTHER REFERENCES

McCarty et al.: "Mining Engineering," vol. 11, No. 1, January 1959, pp. 61–65.